United States Patent
Fujita et al.

(10) Patent No.: US 8,589,028 B2
(45) Date of Patent: Nov. 19, 2013

(54) CONTROL APPARATUS FOR VEHICLE

(75) Inventors: Yoshitaka Fujita, Susono (JP);
Takahiro Kojo, Gotemba (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 159 days.

(21) Appl. No.: 13/263,623

(22) PCT Filed: Apr. 10, 2009

(86) PCT No.: PCT/JP2009/057320
§ 371 (c)(1),
(2), (4) Date: Oct. 7, 2011

(87) PCT Pub. No.: WO2010/116518
PCT Pub. Date: Oct. 14, 2010

(65) Prior Publication Data
US 2012/0029773 A1    Feb. 2, 2012

(51) Int. Cl.
B62D 5/04    (2006.01)

(52) U.S. Cl.
USPC .............................................. 701/41; 348/119

(58) Field of Classification Search
None
See application file for complete search history.

(56) References Cited

U.S. PATENT DOCUMENTS

| | | | |
|---|---|---|---|
| 6,134,491 A | 10/2000 | Kawagoe et al. | |
| 2004/0262063 A1* | 12/2004 | Kaufmann et al. | 180/169 |
| 2005/0267661 A1* | 12/2005 | Iwazaki et al. | 701/41 |
| 2005/0270145 A1 | 12/2005 | Kataoka et al. | |
| 2006/0142922 A1 | 6/2006 | Ozaki et al. | |
| 2008/0117033 A1 | 5/2008 | Kataoka et al. | |

FOREIGN PATENT DOCUMENTS

| | | |
|---|---|---|
| DE | 10 2006 028 610 A1 | 12/2007 |
| EP | 1 602 552 A2 | 12/2005 |
| EP | 1 602 557 A2 | 12/2005 |
| EP | 1 602 557 A3 | 12/2005 |
| JP | 09 123934 | 5/1997 |
| JP | 9-301206 | 11/1997 |
| JP | 2000 318622 | 11/2000 |
| JP | 2002 274402 | 9/2002 |

(Continued)

OTHER PUBLICATIONS

Extended European Search Report issued Aug. 30, 2012, in European Patent Application No. 09843028.3.

(Continued)

Primary Examiner — Michael J Zanelli
(74) Attorney, Agent, or Firm — Oblon, Spivak, McClelland, Maier & Neustadt, L.L.P.

(57) ABSTRACT

Lane keeping control is ended in accurate timing which does not give an uncomfortable feeling to a driver. In a vehicle 10 which is provided with a steering mechanism 200, an EPS actuator 300, and a VGRS actuator 500 and which can change a rudder angle regardless of a driver's steering input due to the cooperative control of the aforementioned mechanism and actuators, an ECU 100 performs LKA end control. In the control, in cases where a winker lever 16 is operated in a period of performing LKA control for making the vehicle 10 follow a target driving route, if the indicated direction of the winker lever 16 is different from a generation direction of generating an assist steering torque TA of the EPS actuator 300 in the LKA control, the LKA control is promptly ended. In cases where the indicated direction is equal to the generation direction, if a steering angle MAdrv corresponding to the driver's steering input exceeds a steering angle MAlka generated by the LKA control, the LKA control is ended.

5 Claims, 3 Drawing Sheets

(56) References Cited

FOREIGN PATENT DOCUMENTS

| JP | 2003 141694 | 5/2003 |
| JP | 2004 026031 | 1/2004 |
| JP | 2006 069323 | 3/2006 |
| JP | 2006 182308 | 7/2006 |
| JP | 2006 248304 | 9/2006 |
| JP | 2007 296920 | 11/2007 |
| JP | 2007 313978 | 12/2007 |

OTHER PUBLICATIONS

International Search Report Issued May 26, 2009 in PCT/JP09/057320 Filed Apr. 10, 2009.

* cited by examiner

CONTROL APPARATUS FOR VEHICLE

TECHNICAL FIELD

The present invention relates to a control apparatus for a vehicle for controlling a vehicle capable of performing lane keeping control, such as Lane Keeping Assist (LKA), by using a steering mechanism, such as an active steering mechanism.

BACKGROUND ART

As this type of apparatus, there has been suggested an apparatus for issuing a warning if a vehicle departs from a lane (e.g. refer to a patent document 1). According to a lane departure warning apparatus for a vehicle disclosed in the patent document 1, a passenger and/or a driver is not troubled by that the warning is not issued if the departure direction of the vehicle is equal to the indicated direction of a winker or direction indicator in cases where it is judged that the vehicle departs from a driving lane while the winker is in operation.

Moreover, there has been also suggested an apparatus for evaluating the possibility of steering by the driver and for varying easiness in stopping the steering control in order to solve such a problem that the stop timing of steering control can give an uncomfortable feeling to a driver if the steering control is stopped in accordance with the blinking operation of the winker (e.g. refer to a patent document 2).

Moreover, there has been also suggested an apparatus for judging that the driver consciously changes the lane and for setting a departure judgment flag to be OFF if a direction indicated by a direction switch signal is equal to a direction indicated by the departure direction (e.g. refer to a patent document 3).

Moreover, there has been also suggested an apparatus for changing a steering assist torque if a winker operating direction is equal to a steering direction (e.g. refer to a patent document 4).

PRIOR ART DOCUMENT

Patent Document

Patent document 1: Japanese Patent Application Laid Open No. 2006-069323
Patent document 2: Japanese Patent Application Laid Open No. 2007-313978
Patent document 3: Japanese Patent Application Laid Open No. 2007-296920
Patent document 4: Japanese Patent Application Laid Open No. 2002-274402

DISCLOSURE OF INVENTION

Subject to be Solved by the Invention

In the vehicle capable of performing this type of lane keeping control, in cases where a winker operation is performed during the implementation of the lane keeping control, if the winker operation is considered to be a type of driver input, there arises a need to end the lane keeping control. However, in the lane keeping control, a steering force for promoting the steering of steered wheels is applied to the steered wheels to a greater or lesser degree. Thus, if the lane keeping control is ended due to this type of winker operation, the deflection of the vehicle associated with the end of the lane keeping control will be different from a direction intended by the driver, and that sometimes gives an uncomfortable feeling to the driver. In the technical ideas disclosed in the patent documents described above, the uncomfortable feeling given to the driver by this type of vehicle deflection is not considered.

In other words, the conventional technologies exemplified in the patent documents have such a technical problem that the vehicle may deflect in a direction which is not intended by the driver when the lane keeping control is ended by the operations of the direction indicator. In view of the aforementioned problem, it is therefore an object of the present invention to provide a control apparatus for a vehicle capable of ending the lane keeping control without giving the uncomfortable feeling to the driver.

Means for Solving the Subject

The above object of the present invention can be achieved by a control apparatus for a vehicle provided with a steering mechanism capable of changing a rudder angle of steered wheels regardless of a driver's steering input, the control apparatus provided with: a performing device for performing predetermined lane keeping control for controlling the steering mechanism such that the vehicle does not depart from a target driving route, in response to a lane keeping request; and an ending device for ending the lane keeping control on the basis of an operating state of a direction indicator and a control state of the steering mechanism in a period of performing the lane keeping control.

The vehicle of the present invention is a vehicle provided with the steering mechanism capable of changing the rudder angle (i.e. actual rudder angle) of the steered wheels regardless of the driver's steering input (preferably meaning the input of a steering torque which can be given via an operating device for promoting the steering operation of the driver, such as a steering wheel, the performance of an operation accompanied by a change in a steering angle (i.e. the operating angle or rotation angle of the operating device), or the like).

The control apparatus for the vehicle of the present invention is a control apparatus of the vehicle and can adopt forms of various computer systems such as various processing units like a single or a plurality of Electronic Control Units (ECUs) or the like, various controllers or microcomputer apparatuses, which can include one or a plurality of Central Processing Units (CPUs), Micro Processing Units (MPUs), various processors or various controllers, or various memory devices such as a Read Only Memory (ROM), a Random Access Memory (RAM), a buffer memory or a flush memory, as occasion demands.

There can be various practical aspects of the steering mechanism of the present invention. For example, the steering mechanism of the present invention may be: (1) an electrical rudder angle varying mechanism referred to as a Steer By Wire (hereinafter abbreviated as a "SBW" as occasion demands) or the like, which can directly or indirectly apply to the steered wheels a steering force for promoting the change in the rudder angle independently of the steering angle; (2) various electronically-controlled power steering apparatuses such as a so-called Electronic Controlled Power Steering (EPS) which can assist the rotational motions of a steering shaft and a pinion gear or the linear motion of a rack bar engaging with the pinion gear, due to the supply of the steering torque from a rotating electrical machine such as a motor; (3) a transmission ratio varying apparatus such as a Variable Gear Ratio Steering (VGRS) which can vary a change ratio of the rudder angle with respect to the steering angle, i.e. a rudder angle transmission ratio (e.g. a value obtained by dividing the steering angle by the actual rudder angle); or another mechanism.

According to the control apparatus for the vehicle of the present invention, in its operation, the lane keeping control is performed by the performing device in response to the lane keeping request, and a lane keeping function such as, for example, LKA, is added to the vehicle. The lane keeping control means as its concept that an object (including, for example, a white line (which does not simply mean that the color is white), a lane marker, or the like) is recognized by a proper detecting device (e.g. an in-vehicle camera or the like) and the rudder angle is controlled automatically (incidentally, in this case, the wording "automatically" means that it is independent of the driver's steering input) such that the driving lane of the vehicle is maintained to a lane defined by the object (in other words, such that the vehicle does not depart from the object).

On the other hand, from the viewpoint that the driver's will is prioritized, it is desirable that the lane keeping control is ended without delay if the driver's steering will is shown in a proper form (e.g. by the steering operation or the operation of the direction indicator, or the like). In other words, in performing the lane keeping control, basically, there is no driver's steering input.

Here, when this type of lane keeping control which can be performed independently of the driver's steering input is ended in accordance with the operation of the direction indicator, the vehicle may deflect in some cases, which is not intended by the driver. Specifically, in the situation that the steering force is applied to the steered wheels (e.g. the steering torque is applied to the steering shaft) by the steering mechanism just before the end of the lane keeping control, if the application of the steering force is stopped (incidentally, being instantly stopped and being gradually reduced are basically the same), the steered wheels are steered (the rudder angle is returned) in a direction opposite to a direction of applying the steering force. However, the operation of the direction indicator is not necessarily accompanied by a physical or electrical steering input although it indicates the driver's steering will. Thus, when the operation of the direction indicator is merely performed, the vehicle deflects due to the steering phenomenon of the steered wheels associated with the end of the lane keeping control. The deflection of the vehicle can occur in the same manner, regardless of whether the steering mechanism is controlled to change the steering angle or not to change the steering angle (including a case where the change is sufficiently small) when the lane keeping control is performed. Moreover, the deflection of the vehicle is not caused by the driver's will. Thus, the driver will highly likely feel uncomfortable about the deflection of the vehicle. In particular, if the steering mechanism is controlled not to change the rudder angle when the lane keeping control is performed, the driver will likely feel remarkably uncomfortable.

Thus, in the control apparatus for the vehicle of the present invention, the ending device ends the lane keeping control on the basis of the operating state of the direction indicator and the control state of the steering mechanism in the period of performing the lane keeping control.

How the deflection of the vehicle, which can occur in ending the lane keeping control, is perceived by the driver depends significantly on the operating state of the direction indicator, such as whether or not the direction indicator is operated or in which direction the indicated direction of the direction indicator is, and the control state of the steering mechanism including whether or not the steering force or steering torque is applied in performing the lane keeping control or its application direction, or whether or not there is the driver's steering input.

Therefore, as described above, it is possible to reduce the uncomfortable feeling given to the driver at least to some extent, by ending the lane keeping control while determining or selecting the various end aspects of the lane keeping control as occasion demands, such as whether to end the lane keeping control promptly, whether to continue the lane keeping control over a certain or uncertain period, in which timing a process associated with the end is started, in which timing the process associated with the end is completed, whether it is to be ended with a stepwise or continuous steering force or a gradual reduction in the steering torque, and the like, on the basis of the operating state of the direction indicator and the control state of the steering mechanism.

In one aspect of the control apparatus for the vehicle of the present invention, the control state is a generation direction of generating a steering torque in a course of performing the lane keeping control, the operating state is an indicated direction of the direction indicator, and the ending device changes end timing of the lane keeping control in accordance with whether or not the generation direction is equal to the indicated direction.

If the generation direction of the steering torque in the course of performing the lane keeping control is equal to the indicated direction of the direction indicator (i.e. the direction intended by the driver), the deflection direction of the vehicle in ending the lane keeping control is opposite to the indicated direction. On the other hand, if the generation direction of the steering torque is different from the indicated direction of the direction indicator, the deflection direction of the vehicle in ending the lane keeping control is equal to the indicated direction. The deflection of the vehicle which is not intended by the driver corresponds simply to the former case. Thus, according to this aspect, the generation of the uncomfortable feeling in ending the lane keeping control is suppressed, effectively and efficiently.

Incidentally, in this aspect, the ending device may end the lane keeping control belatedly in comparison with a case where the generation direction is different from the indicated direction, if the generation direction is equal to the indicated direction.

As described above, by delaying the end of the lane keeping control, the deflection of the vehicle associated with the end of the lane keeping control no longer occurs at least as a series of phenomena linked to the operation of the direction indicator. Thus, it is effective in suppressing the generation of the uncomfortable feeling.

Moreover, in this aspect, the ending device may end the lane keeping control after the steering input is performed, if the generation direction is equal to the indicated direction.

If the lane keeping control is ended after the steering input by the driver (which may cause the change in the steering angle or which may be the input of the steering torque) is performed (i.e. in other words, if the lane keeping control is maintained until the steering input takes place), at least the driver performs the steering operation corresponding to the driver's steering will at a time point of starting the process associated with the end of the lane keeping control. Thus, even if the vehicle deflects, the magnitude of the deflection is small. Moreover, depending on the magnitude of the steering input, it is possible to suppress the deflection of the vehicle. Therefore, it is effective in suppressing the uncomfortable feeling given to the driver.

Moreover, in this aspect, the ending device may end the lane keeping control at a time point of performing an operation of the direction indicator, if the generation direction is different from the indicated direction.

If the generation direction of the steering torque is different from the indicated direction of the direction indicator, as described above, the change in the rudder angle which occurs in ending the lane keeping control is equal to the indicated direction. Thus, the deflection of the vehicle matches the driver's will regardless of whether or not there is the steering input. Therefore, even if the lane keeping control is ended at the time point of operating the direction indicator, there will be no problem in practice. Moreover, since the driver's steering will is reflected as quickly as possible, it is preferable.

In another aspect of the control apparatus for the vehicle or the present invention, the ending device ends the lane keeping control if a steering torque is inputted and the inputted steering torque exceeds a threshold value determined in accordance with the inputted steering torque in a case where the direction indicator is operated.

According to this aspect, firstly, the steering torque is inputted by the driver at the time point of starting the process associated with the end of the lane keeping control. Thus, the vehicle does not deflect as the lane keeping control is ended. Moreover, depending on the seeing of the threshold value, it is possible to certainly prevent the uncomfortable feeling from being given to the driver.

Moreover, secondly, the steering torque as the steering input is overridden by the steering torque supplied to the steering shaft by the steering mechanism in the course of performing the lane keeping control. Thus, if the direction of the steering torque in the course of performing the lane keeping control is equal to the direction of the steering torque as the steering input (i.e. which is a steering direction and which is the indicated direction of the direction indicator as long as the driver does not make a mistake), the steering torque as the steering input is relatively small. On the other hand, if the direction of the steering torque in the course of performing the lane keeping control is different from the direction of the steering torque as the steering input, the steering torque as the steering input is relatively large. By using this phenomenon, it is easy and possible to judge the indicated direction of the direction indicator by using the steering torque as the steering input.

Therefore, by taking such measures that the threshold value is set to be large in an area in which the steering torque as the steering input is relatively small and that the threshold value is set to be small in an area in which the steering torque as the steering input is relatively large or similar measures, it is possible to suppress the uncomfortable feeling given to the driver.

The operation and other advantages of the present invention will become more apparent from the embodiments explained below.

Mode for Carrying Out the Invention

Hereinafter, various embodiments of the control apparatus for the vehicle in the present invention will be explained with reference to the drawings as occasion demands.

FIRST EMBODIMENT

Configuration of Embodiment

Figure 1:
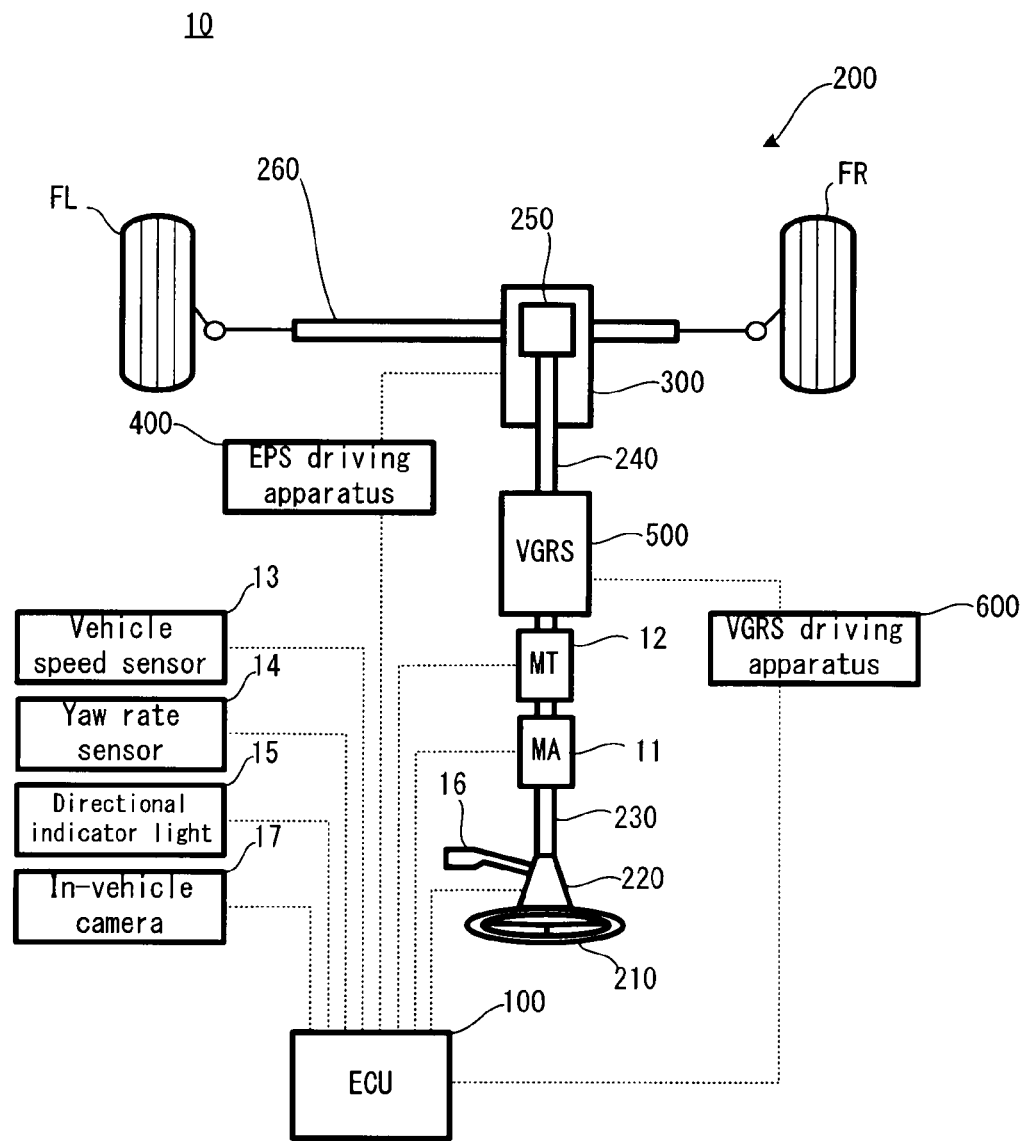
FIG. 1 is a schematic configuration diagram conceptually showing the structure of a vehicle in a first embodiment of the present invention.

Firstly, with reference to FIG. 1, the structure of a vehicle 10 in a first embodiment of the present invention will be explained. FIG. 1 is a schematic configuration diagram conceptually showing the structure of the vehicle 10.

In FIG. 1, the vehicle 10 is provided with a pair of front wheels FL and FR on either sides as steered wheels, and it is configured to move in a desired direction by steering the front wheels. The vehicle 10 is provided with an ECU 100, a steering mechanism 200, an EPS actuator 300, an EPS driving apparatus 400, a VGRS actuator 500, and a VGRS driving apparatus 600.

The ECU 100 is provided with a CPU, a ROM, and a RAM, each of which is not illustrated, and it is an electronic control unit capable of controlling all the operations of the vehicle 10. The ECU 100 is one example of the "control apparatus for the vehicle" of the present invention. The ECU 100 is configured to perform LKA end control described later, in accordance with a control program stored in the ROM.

Incidentally, the ECU 100 is a unified or one-body electronic control unit, configured to function as one example of each of the "performing device" and the "ending device" of the present invention. The operations of each of the devices are all performed by the ECU 100. However, the physical, mechanical and electrical configurations of each of the devices of the present invention are not limited to this, and each of the devices may be configured as various computer systems, such as a plurality of ECUs, various processing units, various controllers, or micro computer apparatuses.

The steering mechanism 200 is a transmission mechanism for transmitting a steering operation performed by a driver to each of the steered wheels. The steering mechanism 200 is provided with a steering wheel 210, a steering column 220, an upper steering shaft 230, a lower steering shaft 240, a pinion gear 250, and a rack bar 260.

The steering wheel 210 is an operating device for promoting the steering operation performed by the driver.

The steering column 220 is a case unit for accommodating the rotating shaft of the steering wheel 210.

The upper steering shaft 230 is a steering input shaft coupled with the steering wheel 210 via the steering column 220, and it is configured to rotate substantially integrally with the steering wheel 210.

The lower steering shaft 240 is a steering output shaft coupled with the upper steering shaft 230 via the VGRS actuator 500 described later at one end. The other end of the lower steering shaft 240 is coupled with the pinion gear 250 accommodated in a steering gear box (whose reference numeral is omitted). Incidentally, the lower steering shaft 240 and the pinion gear 250 may be coupled directly or indirectly via a proper mediate mechanism.

The pinion gear 250 is a gear part which is configured to rotate substantially integrally with the lower steering shaft 240 and in which gear teeth are formed on its outer circumferential surface. The gear teeth of the pinion gear 250 engage with gear teeth formed on the surface of the rack bar 260.

The rack bar 260 is a rodlike member for transmitting a steering force, which extends in a vehicle lateral direction. The gear teeth formed on the surface of the rack bar 260 engage with the gear teeth on the pinion gear 250 side described above. The rack bar 260 is configured to convert the rotational motion of the pinion gear 250 to a linear motion in the vehicle lateral direction. On the other hand, on each of the both ends of the rack bar 260, there are coupled a tie rod and a knuckle (whose reference numerals are omitted) via which each steered wheel is coupled. Therefore, due to the linear motion in the vehicle lateral direction of the rack bar 260, each steered wheel can be steered in a horizontal steering direction. In other words, in the steering mechanism 200, a so-called rack and pinion type steering mechanism is realized by the pinion gear 250 and the rack bar 260.

The EPS actuator 300 is an electric actuator provided with an EPS motor (not illustrated) as a DC brushless motor including: a not-illustrated rotor as a rotator to which a permanent magnet is attached; and a stator as a stationary part which surrounds the rotor. The EPS motor can generate an assist steering torque TA in the direction of rotation of the rotor, which is rotated by the action of a rotating magnetic field formed in the EPS motor due to the electrification to the stator via the EPS driving apparatus 400.

On the other hand, a not-illustrated reduction gear is fixed to a motor shaft as the rotating shaft of the EPS motor, and the reduction gear also engages with the pinion gear 250. Thus, the assist steering torque TA generated from the EPS motor functions as a torque for assisting the rotation of the pinion gear 250. The pinion gear 250 is coupled with the lower steering shaft 240 as described above, and the lower steering shaft 240 is coupled with the upper steering shaft 230 via the VGRS actuator 500. Therefore, a steering torque MT applied to the upper steering shaft 230 via the steering wheel 210 is transmitted to the rack bar 260 in the form that it is assisted by the assist steering torque TA, as occasion demands, by which the driver's steering load is reduced.

The EPS driving apparatus 400 is an electric drive circuit, including a PWM circuit, a transistor circuit, an inverter, and the like, capable of electrifying the stator of the EPS motor. The EPS driving apparatus 400 is electrically connected to a not-illustrated battery, and it can supply a driving voltage to the EPS motor by using an electric power supplied from the battery. Moreover, the EPS driving apparatus 400 is electrically connected to the ECU 100, and its operations are controlled by the ECU 100.

Incidentally, in the embodiment, the EPS actuator 300 and the EPS driving apparatus 400 constitute a type of electronically-controlled power steering apparatus. The structure of this type of power steering apparatus for assisting the steering torque MT is not limited to what is exemplified here. For example, the assist steering torque TA outputted from the EPS motor may be directly transmitted to the lower steering shaft 240 with a reduction in a rotational speed by the not-illustrated reduction gear, or it may be applied as a force for assisting the reciprocating motion of the rack bar 260.

The VGRS actuator 500 is a rudder angle transmission ratio varying device provided with a housing, a VGRS motor, and a reduction gear mechanism (each of which is not illustrated).

The housing is a case for accommodating the VGRS motor and the reduction gear mechanism. The end on the downstream side of the upper steering shaft 230 is fixed to the housing. The housing and the upper steering shaft 230 can rotate substantially integrally.

The VGRS motor is a DC brushless motor having a rotor as a rotator, a stator as a stationary part, and a rotating shaft as the output shaft of a driving force. The stator is fixed to the inside of the housing, and the rotor is rotatably held within the housing. The rotating shaft is coaxially rotatably fixed to the rotor, and its end on the downstream side is coupled with the reduction gear mechanism.

The reduction gear mechanism is a planetary gear mechanism having a plurality of rotational elements which can perform differential rotation (a sun gear, a carrier, and a ring gear). Of the plurality of rotational elements, the sun gear as the first rotational element is coupled with the rotating shaft of the VGRS motor, and the carrier as the second rotational element is coupled with the housing. Moreover, the ring gear as the third rotational element is coupled with the lower steering shaft 240.

According to the reduction gear mechanism having such a structure, the rotation angle of the upper steering shaft 230 according to a steering angle MA as the operating angle of the steering wheel 210 (i.e. the rotational angle of the housing coupled with the carrier) and the rotation angle of the VGRS motor (i.e. the rotational angle of the rotating shaft coupled with the sun gear) uniquely determine the rotation angle of the lower steering shaft 240 coupled with the ring gear as the remaining one rotational element.

At this time, it is possible to perform increase/reduction control on the rotational speed of the lower steering shaft 240 by performing increase/reduction control on the rotational speed of the VGRS motor by means of the differential action between the rotational elements. In other words, the upper steering shaft 230 and the lower steering shaft 240 can perform relative rotation by the action of the VGRS motor and the reduction gear mechanism. Moreover, in terms of the structure of each rotational element in the reduction gear mechanism, the rotational speed of the VGRS motor is transmitted to the lower steering shaft 240 in the state that it is reduced in accordance with a predetermined reduction ratio determined in accordance with a gear ratio between the rotational elements.

As described above, in the vehicle 10, since the upper steering shaft 230 and the lower steering shaft 240 can perform the relative rotation, a rudder angle transmission ratio is continuously variable in a predetermined set range, wherein the rudder angle transmission ratio is a ratio between the steering angle MA as the rotation angle of the upper steering shaft 230 and an actual rudder angle δr of the steered wheels which is uniquely determined according to the rotation angle of the lower steering shaft 240 (which is also related to the gear ratio of a rack and pinion mechanism described later). Incidentally, the rudder angle transmission ratio may be defined practically in any manner; however, it is defined as MA/δr here.

Incidentally, the reduction gear mechanism may have not only the planetary gear mechanism exemplified here but also another aspect (e.g. an aspect in which gears, each having the different number of teeth, are coupled with the upper steering shaft 230 and the lower steering shaft 240, in which a flexible gear in contact with each of the gears in one portion is set, and in which the flexible gear is rotated by using a motor torque transmitted via a wave generator, thereby relatively rotating the upper steering shaft 230 and the lower steering shaft 240, or similar aspects). Alternatively, the reduction gear mechanism may have a physical, mechanical, or mechanistic aspect different from the aforementioned aspect even in the planetary gear mechanism.

The VGRS driving apparatus 600 is an electric drive circuit, including a PWM circuit, a transistor circuit, an inverter, and the like, capable of electrifying the stator of the VGRS motor. By driving the VGRS actuator 200, the VGRS driving apparatus 600 functions as the rudder angle transmission ratio varying apparatus together with the VGRS actuator. The VGRS driving apparatus 600 is electrically connected to a not-illustrated battery, and it can supply a driving voltage to the VGRS motor by using an electric power supplied from the battery. Moreover, the VGRS driving apparatus 600 is electrically connected to the ECU 100, and its operation is controlled by the ECU 100.

Here, the steering mechanism 200 in the embodiment, the EPS actuator 300, and the VGRS actuator 500 constitute one example of the "steering mechanism capable of changing the rudder angle of the steered wheels regardless of the steering input of the driver" in the present invention. Explaining it more specifically, the EPS actuator 300 can apply to the steered wheels a steering force for promoting the steering of the steered wheels. The rotation of the pinion gear 250 which causes the linear motion of the rack bar 260 is accompanied by the rotation of the lower steering shaft 240 if nothing is done. Thus, under a constant rudder angle transmission ratio, a relation between the steering angle MA and a rudder angle δst does not change. In other words, it is possible to promote the steering of the steered wheels independently of the driver's will; however, as a result, the steering wheel 210 will also rotate independently of the driver's will.

Thus, the VGRS actuator 500 is driven in a form of synchronization with the control of the EPS actuator 300 as described above. Explaining it more specifically, when the steered wheels are changed independently of the driver's will by applying a driving force (the assist steering torque TA) from the EPS actuator 300, the VGRS actuator 500 reduces the rudder angle transmission ratio. In other words, according to the previous definition, the VGRS motor is controlled such that the steering angle MA (or actual rudder angle δst) required to obtain one actual rudder angle δst is reduced (or increased). As a result, even if the EPS actuator 300 changes the actual rudder angle δst of the steered wheels, the rotation of the lower steering shaft 240 accompanied by that is hardly transmitted to the upper steering shaft 230, and it no longer causes the rotation of the steering wheel 210.

Further to that, the VGRS actuator 300 is in a form in which the VGRS motor is so-called in the air. If it is tried to realize this type of steering by using only the VGRS actuator 500, instead of the steered wheels being steered, the steering wheel 210 is steered in the opposite direction. Therefore, there can be a difficulty in practice in covering the application of the steering force to the steered wheels only with the VGRS actuator 500. In other words, by cooperatively controlling the EPS actuator 300 and the VGRS actuator 500, this type of steering can be preferably realized.

On the other hand, the vehicle 10 is provided with a steering angle sensor 11, a steering torque sensor 12, a vehicle speed sensor 13, a yaw rate sensor 14, a directional indicator light 15, a winker lever 16, and an in-vehicle camera 17.

The steering angle sensor 11 is a sensor capable of detecting the steering angle MA which indicates the amount of rotation of the upper steering shaft 230. The steering angle sensor 11 is electrically connected to the ECU 100, and the detected steering angle MA is referred to by the ECU 100 with a constant or irregular period.

The steering torque sensor 12 is a sensor capable of detecting the steering torque MT given via the steering wheel 11 from the driver. Explaining it more specifically, the upper steering shaft 230 has such a structure that it is divided into an upstream part and a downstream part and that the parts are mutually coupled by using a not-illustrated torsion bar. To the both ends on the upstream side and the downstream side of the torsion bar, rings for detecting a rotational phase difference are fixed. The torsion bar is twisted in its rotational direction in accordance with the steering torque transmitted via the upstream part of the upper steering shaft 230 when the driver of the vehicle 10 operates the steering wheel 210, and the steering torque can be transmitted to the downstream part with the twist generated. Therefore, upon the transmission of the steering torque, there is the rotational phase difference between the rings for detecting the rotational phase difference described above. The steering torque sensor 12 can detect the rotational phase difference, convert the rotational phase difference to the steering torque, and output it as an electrical signal corresponding to the steering torque MT. Moreover, the steering torque sensor 12 is electrically connected to the ECU 100, and the detected steering torque MT is referred to by the ECU 100 with a constant or irregular period.

The vehicle speed sensor 13 is a sensor capable of detecting a vehicle speed V as the speed or velocity of the vehicle 10. The vehicle speed sensor 13 is electrically connected to the ECU 100, and the detected vehicle speed V is referred to by the ECU 100 with a constant or irregular period.

The yaw rate sensor 14 is a sensor capable of detecting a yaw rate γ as the speed or velocity in the yaw direction of the vehicle 10. The yaw rate sensor 14 is electrically connected to the ECU 100, and the detected yaw rate γ is referred to by the ECU 100 with a constant or irregular period.

The directional indicator light 15 is an indicator for indicating a direction for announcing the moving direction of the vehicle 10. Pair of the directional indicator lights 15 are disposed on either sides in the front part, rear part, door mirror part, and meter hood in front of a driver's seat of the vehicle 10. The directional indicator light 15 is coupled with a light driving part electrically connected to a not-illustrated battery, and it blinks at proper time intervals due to the supply of an electric power from the light driving part.

The winker lever 16 is an operating device fixed on the left side of the steering column 220 such that it can turn in the vertical direction. With regard to the winker lever 16, an upward direction with the steering wheel 210 in the front corresponds to a right direction, and a downward direction corresponds to a left direction (incidentally, depending on the type of the vehicle, the winker lever 16 may be disposed on the right side of the steering column 220, and the upward direction and the downward direction correspond to the left direction and the right direction, respectively). The directional indicator light 15 and its operations are linked such that if the winker lever 16 is operated to a lock position in one turning direction, the directional indicator light 15 corresponding to the turning direction blinks. Moreover, if the winker lever 16 is returned to a neutral position from the lock position, accordingly, the blinking of the directional indicator light 15 is also ended.

The winker lever 16 operated to the lock position is physically locked at the lock position by a locking mechanism disposed in the steering column 220. The locking of the winker lever 16 is released if the winker lever 16 is forcibly returned to the neutral position by the driver or if a winker-off process associated with winker-off control described later is performed.

Incidentally, the light driving part of the directional indicator light 15 described above and the locking mechanism are electrically connected to the ECU 100, and they are drive-controlled by the ECU 100. The winker lever 16 (including the locking mechanism) and the directional indicator light 15 (including the light driving device) are one example of the "direction indicator" of the present invention, which constitutes a so-called winker apparatus. Hereinafter, in collectively calling them, a word of "direction indicator" will be used as occasion demands.

The in-vehicle camera 17 is an imaging apparatus which is disposed on the front nose or front bumper of the vehicle 10 or the like and which can image a predetermined area ahead of the vehicle 10. The in-vehicle camera 17 is electrically connected to the ECU 100, and the imaged area ahead is sent out to the ECU 100 as image data with a constant or irregular period. The ECU 100 can analyze the image data and obtain various data necessary for LKA control described later.

Operations in Embodiment

Details of LKA Control

In the vehicle 10, as one of driving assist control of the vehicle 10, the LKA control is performed by the ECU 100. Incidentally, the LKA control is control for making the vehicle 10 follow a target driving route (lane), and it is one example of the "lane keeping control" of the present invention. The LKA control is performed generally as follows.

The ECU 100 judges whether or not a LKA mode is selected (i.e. one example of the "lane keeping request" of the present invention) as a result of such an operation that an operation button for initiating the LKA control disposed in the vehicle interior of the vehicle 10 in advance is operated by the driver. If the LKA mode is selected, the ECU 100 calculates various road surface information required when the vehicle 10 is made to follow the target driving route, on the basis of a white line (incidentally, which is not necessarily white) for defining the target driving route of the LKA, which is detected by using the image data sent out from the in-vehicle camera 17. Incidentally, as the road surface information, a curvature R of the target driving route (i.e. inverse of a radius), a lateral deviation Y between the white line and the vehicle 10, and a yaw angle deviation $\phi$ between the white line and the vehicle 10 or the like are calculated. Incidentally, an aspect of calculating information required for the control to follow the target driving route of this type can apply various aspects including a known image recognition algorithm, and it has a weak correlation with the essential part of the present invention. Thus, the calculation aspect will not be mentioned herein.

If calculating the various road surface information, the ECU 100 calculates target lateral acceleration necessary to make the vehicle 10 follow the target driving route. Incidentally, at this time, the target lateral acceleration can be also calculated in accordance with various known algorithms or arithmetic expressions. Alternatively, a target lateral acceleration map or the like may be referred to, wherein the target lateral acceleration map uses the curvature R, the lateral deviation Y and the yaw angle deviation $\phi$ described above as parameters and it is stored in a proper storing device such as a ROM. If calculating the target lateral acceleration, the ECU 100 calculates a LKA target assist torque and controls the EPS actuator 300 on the basis of the calculated LKA target assist torque, thereby generating the assist steering torque TA corresponding to the LKA target assist torque.

Moreover, at this time, the VGRS actuator 500 is drive-controlled such that a change in the rudder angle δst for making the vehicle 10 follow the target driving route does not appear as a change in the behavior of the steering wheels 210 (i.e. a change in the steering angle MA). As a result, the driver only needs to almost hold the steering wheel 210, and in the situation that the generation of an uncomfortable feeling is suppressed, the vehicle 10 can drive while following the target driving route. Incidentally, the LKA control as described above is merely one example of the control for making the vehicle 10 follow the target driving route, and its practical aspect can adopt various known aspects.

On the other hand, this type of driving assist function is not performed beyond the driver's will. Thus, the ECU 100 stops this type of driving assist without delay if the steering will is shown by the driver. With regard to the LKA control, the ECU 100 ends the LKA control if the operation of the steering wheel 210, the operation of the brake pedal, or the operation of the winker lever 16 is performed. Incidentally, in ending the LKA control, the assist steering torque TA supplied by the EPS actuator 300 at that time point is gradually reduced in accordance with the vehicle speed V. In other words, the gradual reduction period is longer on the higher speed side. As described above, the gradual reduction process according to the vehicle speed V is performed, by which it is prevented that the vehicle behavior is destabilized before and after the end of the LKA control.

Details of LKA End Control

The LKA control as described above needs to be ended if the driver shows a clear steering will. If the operation of the winker lever 16 is performed as an action for indicating such a steering will, since a steering input is not accompanied, the vehicle 10 deflects in a direction different from the direction intended by the driver in some cases. Thus, the ECU 100 can end the LKA control accurately if the winker lever 16 is operated, by performing the LKA end control.

Figure 2:
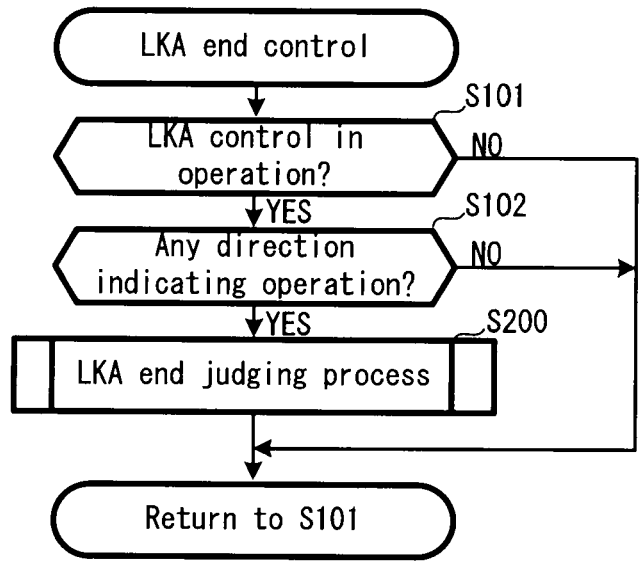
FIG. 2 is a flowchart showing LKA end control performed in the vehicle in FIG. 1.

Now, with reference to FIG. 2, the details of the LKA end control will be explained. FIG. 2 is a flowchart showing the LKA end control.

In FIG. 2, the ECU 100 judges whether or not the LKA control is performed (step S101). If the LKA control is not performed (the step S101: NO), the process operation in the step S101 is repeatedly performed. If the LKA control is performed (the step S101: YES), the ECU 100 judges whether or not there is a direction indicating operation via the winker lever 16 (step S102). If there is no direction indicating operation (the step S102: NO), the process is returned to the step S101.

On the other hand, if there is the direction indicating operation (the step S102: YES), the ECU 100 performs a LKA end judging process (step S200). If the LKA end judging process is performed, the process is returned to the step S101, and a series of process operations is repeated. The LKA end control is performed in this manner.

Figure 3:
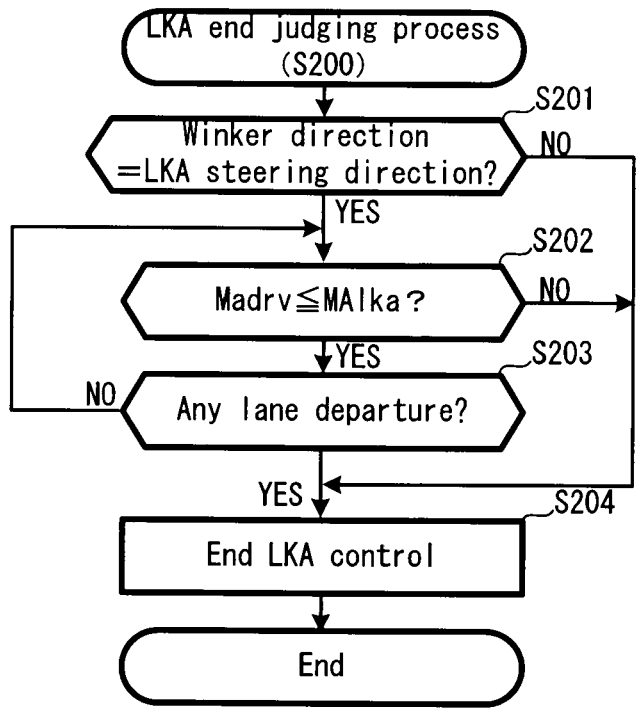
FIG. 3 is a flowchart showing a LKA end judging process performed in the LKA end control in FIG. 2.

Next with reference to FIG. 3, the details of the LKA end control will be explained. FIG. 3 is a flowchart showing the LKA end control.

In FIG. 3, the ECU 100 judges whether or not the indicated direction of the winker lever 16 is equal to a generation direction of generating the assist steering torque TA (i.e. the steering torque corresponding to the LKA target assist torque described above) (step S201). If the indicated direction is different from the generation direction of the assist steering torque TA (the step S201: NO), the ECU 100 moves the process to a step S204.

On the other hand, if the indicated direction is equal to the direction of the assist steering torque TA (the step S201: YES), the ECU 100 judges whether or not a steering angle MAdrv corresponding to the driver's steering input is less than or equal to a steering angle MAlka generated by the LKA control (step S202). If the steering angle MAdrv is greater than the steering angle MAlka (the step S202: NO), i.e. if there is the driver's steering input exceeding the amount of control associated with the LKA control, the ECU 100 moves the process to the step S204.

If the steering angle MAdrv is less than or equal to the steering angle MAlka (the step S202: YES), the ECU 100 judges whether or not the vehicle 10 departs from the target driving route associated with the LKA control (step S203). If the vehicle 10 does not depart from the target driving route (the step S203: NO), the ECU 100 returns the process to the step S202. Moreover, if the vehicle 10 departs from the target driving route (the step S203: YES), the ECU 100 moves the process to the step S204.

In the step S204, the LKA control is ended. If the LKA control is ended, the LKA end judging process is ended, and the process is returned to the LKA end control.

As described above, according to the embodiment, when the LKA control is ended by the direction indicating operation performed by the winker lever 16, if the indicated direction of the winker lever 16 is different from the generation direction of the assist steering torque TA, the direction of the deflection which occurs in the vehicle 10 with the gradual reduction in the assist steering torque TA in ending the LKA control is a direction equal to the driver's steering will. Thus, under the judgment that the uncomfortable feeling is not generated, the LKA control is promptly ended. On the other hand, if the indicated direction is equal to the generation direction of the assist steering torque TA, the direction of the deflection which occurs in the vehicle 10 with the gradual reduction in the assist steering torque TA in ending the LKA control is likely a direction opposite to the driver's steering will. Thus, the end of the LKA control is suspended until the steering angle MAdrv corresponding to the driver's steering input exceeds the steering angle MAlka generated by the LKA control. On the other hand, even in a period in which the end of the LKA control is suspended because the steering angle MAdrv is less than or equal to the steering angle MAlka, if the vehicle 10 departs from the target driving route, the LKA control is ended under the assumption that the driver's steering will is already sufficiently reflected and that the generation of the uncomfortable feeling can be ignored. Thus, if the operation of the winker lever 16 is performed, it is possible to end the LKA control accurately.

SECOND EMBODIMENT

Figure 4:
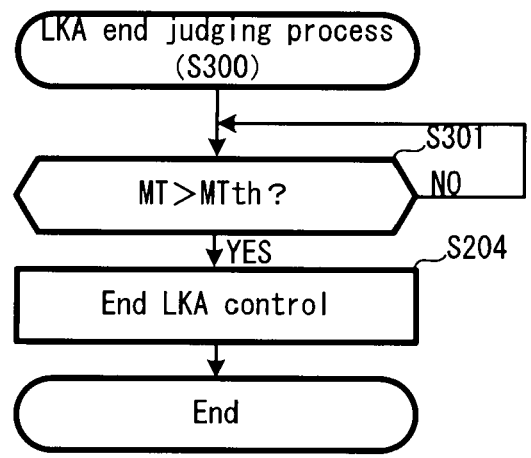
FIG. 4 is a flowchart showing a LKA end judging process in a second embodiment of the present invention.

In the LKA end control illustrated in FIG. 2, the LKA end judging process in the step S202 can be replaced by another process. Here, a second embodiment of the present invention based on the purpose will be explained with reference to FIG. 4. FIG. 4 is a flowchart showing the LKA end judging process in the second embodiment of the present invention. Incidentally, in FIG. 4, portions overlapping those of FIG. 3 will carry the same reference numerals, and the explanation thereof will be omitted as occasion demands.

In FIG. 4, the ECU 100 judges whether or not the steering torque MT as the driver's steering input exceeds a steering torque threshold value MTth (step S301). If the steering torque MT is less than or equal to the steering torque threshold value MTth (the step S301: NO), the process operation in the step S301 is repeatedly performed. On the other hand, if the steering torque MT exceeds the steering torque threshold value MTth (the step S301: YES), the ECU 100 ends the LKA control (the step S204).

Figure 5:
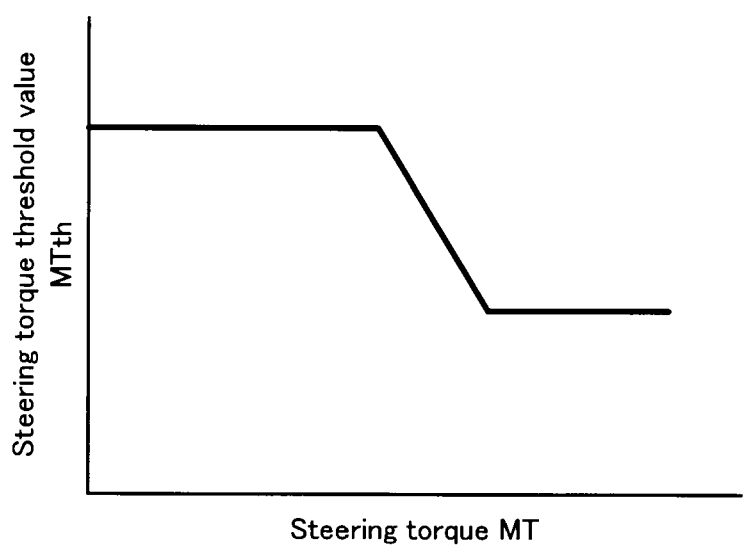
FIG. 5 is a schematic characteristic diagram showing a relation between a steering torque MT and a steering torque threshold value MTth referred to in the LKA end judging process in FIG. 4.

Now, with reference to FIG. 5, an explanation will be given on the details of the steering torque threshold value MTth used for the comparative judgment with the steering torque MT. FIG. 5 is a schematic characteristic diagram showing a relation between the steering torque MT and the steering torque threshold value MTth.

As shown in FIG. 5, the steering torque threshold value MTth is a function of the steering torque MT, and it is set to be large in an area in which the steering torque MT is small, and it is set to be small in an area in which the steering torque MT is large (incidentally, there is also a gradual reduction area as shown). Here, the steering torque MT inputted by the driver is overridden by the assist torque TA supplied by the EPS actuator 300. Thus, if the steering direction intended by the driver (i.e. a generation direction of generating the steering torque MT) is equal to the generation direction of the assist torque TA, the steering torque MT is relatively small. On the other hand, if the steering direction intended by the driver (i.e. the direction of generating the steering torque MT) is opposite to the generation direction of the assist torque TA, the steering torque MT needs to be relatively large.

In other words, in the area in which the steering torque MT is relatively small, the vehicle 10 deflects in a direction different from the generation direction of the steering torque MT due to the gradual decrease in the assist torque TA caused by the end of the LKA control. In the area in which the steering torque MT is relatively large, the vehicle 10 deflects in the generation direction of the steering torque MT due to the gradual decrease in the assist torque TA caused by the end of the LKA control.

In view of this point, in the area in which the steering torque MT is relatively small, the steering torque threshold value MTth is set to be large, and the end of the LKA control is delayed (incidentally, there is no problem because the vehicle 10 is steering-controlled in a desired direction due to the assist steering torque TA) until the relatively large steering torque MT (namely corresponding to the driver's clear steering will) is generated. In the area in which the steering torque MT is relatively large, the steering torque threshold value MTth is set to be small, and the LKA control is promptly ended (incidentally, there is no problem because the vehicle 10 is steering-controlled in a desired direction due to the gradual reduction in the assist steering torque TA). Thus, it is possible to accurately end the LKA control, which does not cause the driver to have the uncomfortable feeling.

The present invention is not limited to the aforementioned embodiments, but various changes may be made, if desired, without departing from the essence or spirit of the invention which can be read from the claims and the entire specification. A control apparatus for a vehicle, which involves such changes, is also intended to be within the technical scope of the present invention.

DESCRIPTION OF REFERENCE CODES

FL, FR steered wheels
10 vehicle
11 steering angle sensor
12 steering torque sensor
13 vehicle speed sensor
14 yaw rate sensor
15 directional indicator light
16 winker lever
17 in-vehicle camera
100 ECU
200 steering mechanism
210 steering wheel
220 steering column
230 upper steering shaft
240 lower steering shaft

250 pinion gear
260 rack bar
300 EPS actuator
400 EPS driving apparatus
500 VGRS actuator
600 VGRS driving apparatus

INDUSTRIAL APPLICABILITY

The present invention can be applied to a vehicle capable of performing lane keeping control by using a steering mechanism for changing a rudder angle regardless of a driver's steering input.

The invention claimed is:

1. A control apparatus for a vehicle comprising a steering mechanism capable of changing a rudder angle of steered wheels regardless of a driver's steering input, said control apparatus comprising:

a performing device for performing predetermined lane keeping control for controlling the steering mechanism such that the vehicle does not depart from a target driving route, in response to a lane keeping request; and an ending device for ending the lane keeping control on the basis of an operating state of a direction indicator and a control state of the steering mechanism in a period of performing the lane keeping control, wherein the control state is a generation direction of generating a steering torque in a course of performing the lane keeping control, the operating state is an indicated direction of the direction indicator, and said ending device changes end timing of the lane keeping control in accordance with whether or not the generation direction is equal to the indicated direction.

2. The control apparatus for the vehicle according to claim 1, wherein said ending device ends the lane keeping control belatedly in comparison with a case where the generation direction is different from the indicated direction, if the generation direction is equal to the indicated direction.

3. The control apparatus for the vehicle according to claim 1, wherein said ending device ends the lane keeping control after the steering input is performed, if the generation direction is equal to the indicated direction.

4. The control apparatus for the vehicle according to claim 1, wherein said ending device ends the lane keeping control at a time point of performing an operation of the direction indicator, if the generation direction is different from the indicated direction.

5. The control apparatus for the vehicle according to claim 1, wherein said ending device ends the lane keeping control if a steering torque is inputted and the inputted steering torque exceeds a threshold value determined in accordance with the inputted steering torque in a case where the direction indicator is operated.

* * * * *